Dec. 2, 1952     A. C. FREIRE     2,619,758

FISHHOOK

Filed Dec. 16, 1949

INVENTOR.
ANTONIO CUNHA FREIRE
BY

Patented Dec. 2, 1952

2,619,758

UNITED STATES PATENT OFFICE 2,619,758

FISHHOOK

Antonio Cunha Freire, Sao Paulo, Brazil

Application December 16, 1949, Serial No. 133,364
In Brazil October 12, 1949

2 Claims. (Cl. 43—36)

The present invention relates to fish hooks, and more particularly to a fishing apparatus including resiliently tensioned hooks which are thrown into the mouth of a fish when a trigger mechanism is released.

It is the object of the present invention to provide a fish hook which is released at the slightest touch and is thrown with great force into the mouth of a fish.

With this object in view the present invention mainly consists in a fish hook comprising, in combination, a V-shaped resilient wire member having two hooks which overlap when the resilient wire member is compressed, and a resilient rod passing through a guiding eye at the apex of the V-shaped wire member and through the loop formed by the hooks of the wire member when the same is compressed. The rod is movable with respect to the V-shaped wire member and secured to a fishing line, so that relative movement of the V-shaped wire member caused by a fish striking the bait releases the compressed resilient V-shaped wire member to throw the hooks outwardly into the mouth of the fish.

The novel features of the invention are set forth in particular in the appended claims. The invention itself will be best understood from the following description of a specific embodiment when read in connection with the accompanying drawings in which:

Figure 1:
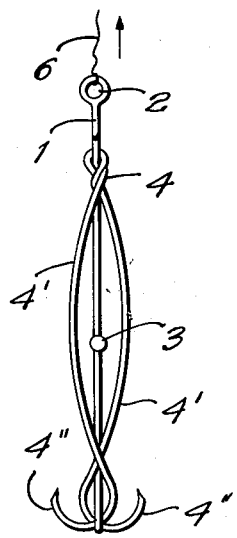
Fig. 1 is a front view of a fish hook according to the present invention in compressed position.
Figure 2:
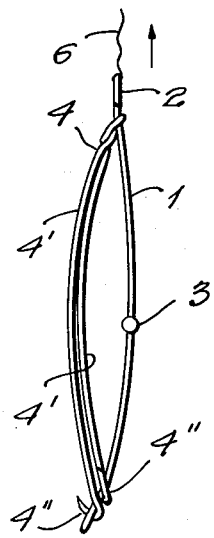
Fig. 2 is a side view of the fish hook.

Referring now to the drawing, a resilient rod 1 passes through a guiding means or eye 5 of a V-shaped resilient wire member 4 having two leg portions 4' ending in hook portions 4". The end of the rod 1 passes through the loop defined by the hook portions 4" in the compressed position of the wire member, as shown in Fig. 1, and engages the same at their crossing point, preventing outward movement of the legs 4'. The other end of the rod 1 is provided with an eye 2 to which the fishing line 6 is attached. Since the V-shaped wire member and the rod 1 are slightly curved, as can be best seen from Fig. 2, the rod 1 does not engage the crossing point of the leg portions 4'.

In the middle of the resilient rod 1 a blocking means 3 is provided which prevents the passing of the resilient rod 1 through the eye 5.

Figure 3:
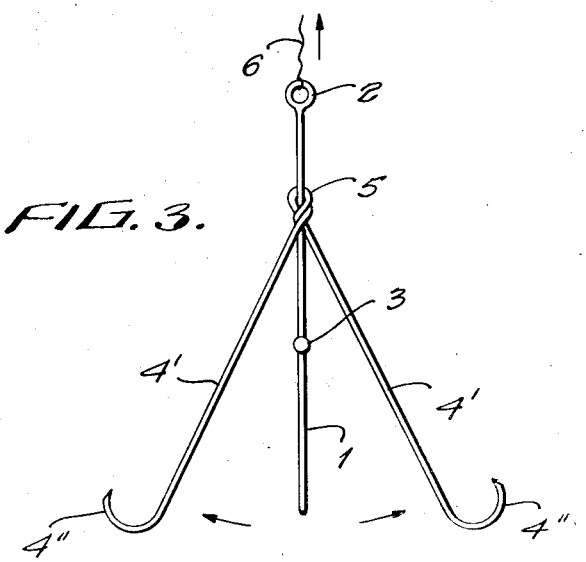
Fig. 3 is a front view of the fish hook with the hooks in released position.

The device operates as follows: When a fish strikes at a bait secured to the hooks 4" and to the end portion of the resilient rod 1, the resilient wire member which is in the position shown in Fig. 1, moves relatively to the rod 1 which is held by the fishing line 6 so that the rod 1 slides out of the loop formed by the hook portions 4" whereby the V-shaped wire member is released, and its legs 4' assume the position shown in Fig. 3. Due to the high resiliency of the V-shaped wire member such movement is very rapid so that the hooks 4" are thrown with great force into the mouth of the fish.

Since the resilient rod 1 holds the V-shaped wire member in compressed position by engaging the outermost ends of the same, a minimum of frictional resistance has to be overcome when the resilient rod 1 slides on the hooks to release the same in a trigger like action.

While the invention has been illustrated and described as embodied in a V-shaped wire member held in compressed position by a resilient rod, it is not intended to be limited to the details shown since various structural changes may be made without departing from the spirit of the present invention.

What is claimed as new and desired to be secured by Letters Patent is:

1. A fish hook, comprising, in combination, a V-shaped resilient wire member having two straight leg portions ending in outwardly directed hook portions adapted to overlap when said leg portions are pressed toward each other into a compressed position, said two leg portions crossing each other in one crossing point, and said two hook portions crossing each other in another crossing point located farther from the apex of said V-shaped wire member so as to define a loop when said V-shaped wire member is in said compressed position said resilient wire member being provided with a guiding means located at the apex of said V-shaped wire member; an elongated resilient rod guided in said guiding means and being longitudinally slidable between a locking position and a releasing position, and having one end portion passing in said locking position through said loop formed by said V-shaped wire member in said compressed position of the same and engaging said hook portions at the second crossing point so as to lock said V-shaped wire member in said compressed position, the other end portion of said rod being adapted to be secured to a fishing line; and blocking means on said rod located between said guiding means and said one end portion of said rod and preventing said rod in said releasing position from sliding out of said guiding means.

2. A fish hook, comprising, in combination, a V-shaped resilient wire member having two straight leg portions ending in outwardly directed hook portions adapted to overlap when said leg portions are pressed toward each other into a compressed position, said two leg portions crossing each other in one crossing point, and said two hook portions crossing each other in another crossing point located farther from the apex of said V-shaped wire member so as to define a loop when said V-shaped wire member is in said compressed position; said resilient wire member being provided with an eye at the apex of the same; an elongated resilient rod passing through said eye of said V-shaped wire member and being longitudinally slidable between a locking position and a releasing position, and having one end portion passing in said locking position through said loop formed by said V-shaped wire member in said compressed position of the same and engaging said hook portions at the second crossing point so as to lock said V-shaped wire member in said compressed position, the other end portion of said rod being adapted to be secured to a fishing line; and blocking means on said rod located between said loop portion and said one end portion of said rod and preventing said shank in said releasing position from sliding out of said loop portion.

ANTONIO CUNHA FREIRE.

REFERENCES CITED

The following references are of record in the file of this patent:

UNITED STATES PATENTS

| Number | Name | Date |
| --- | --- | --- |
| 51,651 | Davis et al. | Dec. 19, 1865 |
| 321,796 | Clark | July 7, 1885 |
| 712,497 | Coffin | Nov. 4, 1902 |
| 973,119 | Lisch | Oct. 18, 1910 |
| 1,623,870 | Goodgame | Apr. 5, 1927 |
| 1,649,140 | Steffens | Nov. 15, 1927 |
| 2,223,946 | Binkowski | Dec. 3, 1940 |